United States Patent [19]

Distler et al.

[11] 4,358,403

[45] Nov. 9, 1982

[54] AQUEOUS LOW-EMULSIFIER DISPERSIONS OF BUTADIENE-STYRENE EMULSION COPOLYMERS CONTAINING CARBOXYL GROUPS

[75] Inventors: Dieter Distler, Mutterstadt; Michael Melan, Wachenheim, both of Fed. Rep. of Germany

[73] Assignee: BASF Aktiengesellschaft, Ludwigshafen, Fed. Rep. of Germany

[21] Appl. No.: 292,223

[22] Filed: Aug. 12, 1981

[30] Foreign Application Priority Data

Sep. 3, 1980 [DE] Fed. Rep. of Germany ....... 3033121

[51] Int. Cl.$^3$ .............................................. C08L 9/08
[52] U.S. Cl. .................................... 524/745; 526/304; 524/747; 524/812; 524/813; 524/821
[58] Field of Search .................... 260/29.7 H; 526/304

[56] References Cited

U.S. PATENT DOCUMENTS

| | | | |
|---|---|---|---|
| 3,740,357 | 6/1973 | Wax | 260/2.5 L |
| 3,817,899 | 6/1974 | Turck | 260/29.7 SQ |
| 3,865,772 | 2/1975 | Hulyalkar | 260/29.7 H |
| 4,017,443 | 4/1977 | Turck et al. | 260/29.6 T |
| 4,065,423 | 12/1977 | Hen | 260/29.7 H |
| 4,130,691 | 12/1978 | Canard et al. | 428/511 |
| 4,298,513 | 11/1981 | Distler et al. | 260/29.7 H |

FOREIGN PATENT DOCUMENTS 1450916 9/1976 United Kingdom .

Primary Examiner—Joseph L. Schofer
Assistant Examiner—Bernard Lipman
Attorney, Agent, or Firm—Oblon, Fisher, Spivak, McClelland & Maier

[57] ABSTRACT

Aqueous low-emulsifier dispersions of emulsion copolymers which contain, as copolymerized units, (a) from 35 to 55% by weight of butadiene,
(b) from 35 to 60% by weight of styrene,
(c) from 1 to 3% by weight of $\alpha,\beta$-monoolefinically unsaturated monocarboxylic acids and/or dicarboxylic acids of 3 to 6 carbon atoms,
(d) from 1 to 3% by weight of amides of $\alpha,\beta$-monoolefinically unsaturated monocarboxylic acids and/or dicarboxylic acids of 3 to 5 carbon atoms,
(e) from 1 to 4% by weight of N-methylolamides of $\alpha,\beta$-monoolefinically unsaturated monocarboxylic acids and/or dicarboxylic acids of 3 to 5 carbon atoms, or their alkyl ethers, and
(f) from 1 to 3% by weight of acrylic acid and/or methacrylic acid monoesters of alkanediols of 2 to 6 carbon atoms, the emulsion containing, as emulsifier, from 0.1 to 0.8% by weight, based on emulsion copolymers, of fatty alcohol-sulfonates and/or alkylbenzenesulfonates, where alkyl is of 12 to 16 carbon atoms, are of particular value as binders for aqueous anti-corrosion paints.

2 Claims, No Drawings

AQUEOUS LOW-EMULSIFIER DISPERSIONS OF BUTADIENE-STYRENE EMULSION COPOLYMERS CONTAINING CARBOXYL GROUPS

The present invention relates to aqueous low-emulsifier dispersions of butadiene-styrene emulsion copolymers containing carboxyl groups which are useful as binders in aqueous anti-corrosion paints.

Examples of binders used in anti-corrosion paints are aqueous dispersions of styrene-acrylate copolymers, butadiene-styrene copolymers and butadiene-styrene copolymers containing carboxyl groups. If a styrene-acrylate copolymer dispersion is employed, it is necessary to add an active anti-corrosion pigment, especially a zinc chromate, to the paint (cf. BASF Leaflet on "Acronal 290 D as a binder dispersion for metal paints"). The addition of such an active anti-corrosion pigment effectively prevents flash-rusting.

Furthermore, such an active anti-corrosion pigment also prevents blistering, especially when subjected to a salt spray. Materials other than zinc chromates which have been proposed as anti-corrosion pigments are less active. Examples of these are the metal complexes named in British Pat. No. 1,450,916 and also proposed therein for anti-corrosion paints which contain butadiene-styrene copolymer dispersions as binders. The use of zinc chromates as active anti-corrosion pigments is however not entirely safe, since the pigments are toxic. It is true that anti-corrosion paints based on aqueous dispersions of butadiene-styrene copolymers do not require zinc chromates as active anti-corrosion pigments, but anti-rust paints of this type, not containing the pigments, give satisfactory rust protection, according to the DIN 50,021 salt spray test, only if a relatively thick coating is applied, ie. in general more than 70 $\mu$m and in most cases more than 100 $\mu$m.

It is an object of the present invention to provide aqueous dispersions of butadiene-styrene emulsion copolymers which, when used as binders in anti-corrosion paints without addition of an active anti-corrosion pigment, give paint films which afford improved rust protection.

We have found that this object is achieved by aqueous low-emulsifier dispersions of carboxyl-containing butadiene-styrene emulsion copolymers which contain, as copolymerized units, (a) from 35 to 55% by weight of butadiene, (b) from 35 to 60% by weight of styrene, (c) from 1 to 3% by weight of $\alpha,\beta$-monoolefinically unsaturated monocarboxylic acids and/or dicarboxylic acids of 3 to 6 carbon atoms, (d) from 1 to 3% by weight of amides of $\alpha,\beta$-monoolefinically unsaturated monocarboxylic acids and/or dicarboxylic acids of 3 to 5 carbon atoms, (e) from 1 to 4% by weight of N-methylolamides of $\alpha,\beta$-monoolefinically unsaturated monocarboxylic acids and/or dicarboxylic acids of 3 to 5 carbon atoms, or their alkyl ethers, and (f) from 1 to 3% by weight of acrylic acid and/or methacrylic acid monoesters of alkanediols of 2 to 6 carbon atoms, the emulsions containing, as emulsifier, only from 0.1 to 0.8% by weight, based on emulsion copolymer, of fatty alcohol-sulfonates and/or alkylbenzenesulfonates, where alkyl is of 12 to 16 carbon atoms, and that these dispersions are particularly suitable binders for aqueous anti-corrosion paints. Such anti-corrosion paints, without addition of active anti-corrosion pigments, exhibit, even when applied in relatively thin coatings, generally of less than 70 $\mu$m, to steel sheet, an excellent anti-rust effect in the salt spray test, which is as good as that of comparable anti-corrosion paints based on styrene-acrylate copolymer dispersions and containing zinc chromates, and surpasses that of anti-corrosion paints based on conventional aqueous dispersions of carboxyl-containing butadiene-styrene copolymers. The aqueous low-emulsifier dispersions of the special carboxyl-containing butadiene-styrene emulsion copolymers are novel. They can be prepared from the monomers (a) to (f) and the alkylbenzenesulfonates and/or the fatty alcohol-sulfonates by batchwise or continuous emulsion copolymerization under the conventional conditions of pressure and temperature and using the conventional amounts of polymerization initiators. Preferably, the emulsion feed process is employed, in which the monomers (c) to (f) are dissolved in a part of the aqueous phase and employed as an initial charge together with a part of the monomers (a) and (b) in emulsified form, the remainder being added to the initial aqueous charge at the rate at which the monomers are consumed. If the polymerization initiator is a water-soluble persulfate, such as an alkali metal peroxydisulfate or ammonium peroxydisulfate, employed in an amount of from 0.2 to 1, especially from 0.2 to 0.6% by weight based on monomers, the reaction is in general carried out at from 70° to 90° C., preferably from 75° to 85° C. If a redox initiator is used, such an initiator being generally employed in an amount of from 0.5 to 1% by weight, based on monomers, the polymerization temperature is in general from 30° to 70° C. and preferably from 40° to 60° C. Examples of suitable redox catalyst systems are alkali metal peroxydisulfates in combination with iron-II sulfate and sodium bisulfite or ascorbic acid as the reducing agent, or cumene hydroperoxide or tert.-butyl hydroperoxide in combination with ascorbic acid and an iron-II salt.

The alkylbenzenesulfonates, alkyl being of 12 to 16 carbon atoms, and fatty alcohol-sulfonates, in which the fatty alcohol radical is in general of from 12 to 16 carbon atoms, are conventional emulsifiers for emulsion polymerization and are commercially available. In preparing the novel dispersions, they are in general employed in an amount of from 0.1 to 0.8% by weight, based on the monomers or on the emulsion copolymers; in most cases, the amount employed in from 0.3 to 0.5% by weight, based on the monomers. Other conventional emulsifiers for the emulsion copolymerization of olefinically unsaturated monomers are less suitable for the preparation of the novel dispersions.

Suitable monomers (c) are, in particular, acrylic acid, methacrylic acid and itaconic acid, as well as crotonic acid and maleic acid. Their amount is preferably from 1 to 3% by weight. Preferred monomers (d) are acrylamide and especially methacrylamide, but also maleamide, fumaramide and crotonamide. The preferred amounts of the preferred monomers (d) are from 1 to 3% by weight. Particularly suitable monomers (e), which are preferably employed in an amount of from 1 to 4% by weight, based on total monomers, are N-methylolacrylamide, N-methylolmethacrylamide, N-methoxymethylacrylamide, N-methoxymethylmethacrylamide, N-n-butoxymethylacrylamide and N,N'-dimethylolfumarodiamide. Particularly suitable monomers (f), which are preferably employed in an amount of from 1 to 3% by weight, based on total monomers, are 2-hydroxyethyl acrylate, 2-hydroxyethyl methacrylate, 3-hydroxypropyl acrylate, 3-hydroxypropyl methacrylate, 1,4-butanediol monoacrylate and 1,4-butanediol monomethacrylate.

In preparing the novel low-emulsifier dispersions of the special carboxyl-containing butadiene-styrene emulsion copolymers it has proved advantageous if, after completion of polymerization, and in particular after the dispersion has cooled, a small amount of a water-soluble reducing agent, in particular sodium formaldehyde-sulfoxylate or ascorbic acid or hydrazine hydrate is added, the amount employed in general being from 0.1 to 0.5% by weight, based on the amount of the monomers or of the polymer. This additive further improves the anti-rust effect of anti-corrosion paints prepared using the novel dispersions as binders, so that the anti-rust effect, at comparable film thickness, is improved by up to 40% compared to that of conventional anti-rust paints containing carboxylated butadiene-styrene copolymers as binders. The pH of the novel dispersions, when these are used as binders for anti-corrosion paints, is preferably about 7 and can, if the emulsion as prepared does not have this value, easily be obtained by, for example, adding aqueous ammonia.

When using the novel copolymer dispersions as binders for anti-rust paints, the conventional amount of such a dispersion, ie. from 20 to 30% by weight of (solid) copolymer, based on the final paint, can be employed. The conventional additives for anti-rust paints can also be incorporated, in particular the conventional thickeners, for example based on polyvinylpyrrolidones, polyacrylic acids or cellulose derivatives, as can conventional pigments, for example titanium dioxides, iron dioxides, chromium oxides and/or lead oxides and zinc oxides, as well as silicate fillers, such as talc and mica, and/or (though less advantageously) calcite fillers, for example chalk.

In the examples which follow, parts and percentages are by weight. The values of the rust resistance, quoted in the Examples, were determined by the DIN 50,021 salt spray test.

EXAMPLE 1

Preparation of the dispersion 17 parts of water, 0.01 part of sodium formaldehyde-sulfoxylate and 0.001 part of tetrasodium ethylenediaminetetraacetate are introduced into a polymerization reactor of capacity 150 parts by volume, flushed with nitrogen and heated to 80° C., with stirring. When this temperature is reached, 8 parts of an emulsion of 26.5 parts of butadiene, 18.5 parts of styrene, 1.5 parts of acrylic acid, 1 part of methacrylamide, 2.22 parts of N-methylolmethacrylamide (45% strength aqueous solution), 1.5 parts of hydroxyethyl acrylate, 1.332 parts of sodium dodecylbenzenesulfonate (15% strength aqueous solution), 0.25 part of tert.-dodecylmercaptan and 22 parts of water are run in over 3 minutes. One part of a mixture of 0.25 part of sodium peroxydisulfate and 7 parts of water is then run in over 2 minutes. Thereafter the mixture is stirred for 20 minutes at 80° C., whereupon the remainder of the monomer emulsion and the remainder of the peroxydisulfate solution are added uniformly over 5 hours. Polymerization is continued for 7 hours at 80° C., steam is passed through the mixture under reduced pressure and thereafter a solution of 0.25 part of sodium formaldehyde-sulfoxylate in 1 part of water is added slowly, with stirring. The pH of the dispersion is then brought to 7 with 10% strength aqueous ammonia.

Testing the dispersion as a binder for an anti-rust paint

The dispersion is employed as a binder for the following anti-rust paint (standard formulation):

| | |
|---|---|
| Dispersion (50% strength) | 126.0 parts |
| Water | 16.2 parts |
| Commercial anionic dispersant | 1.0 part |
| Ammonia | 0.6 part |
| Butyldiglycol acetate | 3.0 parts |
| Commercial thickener (30% strength aqueous solution of a vinylpyrrolidone copolymer) | 1.6 parts |
| Titanium dioxide (rutile) | 23.3 parts |
| Micronized black iron oxide | 4.7 parts |
| Talc | 16.3 parts |
| Mica | 39.7 parts |
| Commercial anti-foam agent | 0.6 part |

The paint is applied at a wet thickness of 150–260 μm (=a dry thickness of 45–80 μm) to a degreased steel sheet and the coating is dried for 15 minutes at 70°–80° C. (The edges and the back of the steel sheet are protected with a commercial non-aqueous anti-rust paint). After 3 days' drying at room temperature, the coating is tested by the DIN 50,021 salt spray test. The resistance time (ie. the time for which there is no blistering and no bleeding of rust, and the penetration at the cut is at most 3 mm) is 264 hours.

For comparison, an aqueous dispersion, prepared in the same manner, of a copolymer of 47.5 parts of butadiene, 41.5 parts of styrene, 3 parts of acrylic acid, 3 parts of methacrylamide and 5 parts of 2-hydroxyethyl acrylate is employed, in the same amount, as the binder in the standard formulation, in place of the dispersion according to the invention; the resistance time is found to be only 144 hours. In a further comparison, in which the binder dispersion contains a copolymer of 51 parts of butadiene, 44 parts of styrene, 3 parts of acrylic acid and 2 parts of N-methylolmethacrylamide, the resistance time of the anti-rust paint in the salt spray test is only 120 hours.

EXAMPLE 2

Following the procedure described in Example 1, an aqueous dispersion of a copolymer is prepared; the latter however contains 53 parts of butadiene, 37 parts of styrene, 3 parts of acrylic acid, 2 parts of methacrylamide, 2 parts of N-methylolmethacrylamide and 3 parts of 2-hydroxyethyl acrylate as copolymerized units. An anti-rust paint prepared from this dispersion in accordance with the description in Example 1 has a resistance time of 240 hours in the salt spray test under the conditions stated in Example 1.

Anti-rust paints prepared for comparison and containing the same amount of an aqueous dispersion of a copolymer, the copolymer however being prepared from (a) 46 parts of butadiene, 48 parts of styrene, 3 parts of acrylic acid and 3 parts of methacrylamide or (b) from 40 parts of butadiene, 56.5 parts of styrene, 3 parts of acrylic acid and 0.5 part of acrylamide or being (c) a commercial carboxylated butadiene-styrene copolymer (®Litex CA) showed shorter resistance times, namely (a)=144 hours, (b)=96 hours and (c)=72 hours.

EXAMPLE 3

Following the procedure described in Example 1, an aqueous dispersion of a copolymer is prepared from 45 parts of butadiene, 48 parts of styrene, 1.5 parts of methacrylic acid, 3 parts of methacrylamide, 1.5 parts of butane-1,4-diol monoacrylate and 1 part of N-methylolmethacrylamide, and an anti-rust paint is produced therefrom as described in Example 1. This paint has a resistance time of 240 hours in the salt spray test under the conditions described in Example 1.

EXAMPLE 4

Following the procedure described in Example 1, an aqueous dispersion of a copolymer is prepared from 38 parts of butadiene, 55.2 parts of styrene, 1 part of itaconic acid, 1 part of methacrylamide, 1 part of hexane-1,6-diol monoacrylate and 3.8 parts of N-methylolacrylamide, using a commercial $C_{12-16}$ fatty alcohol-sulfonate as the emulsifier but otherwise adhering to the same conditions as in Example 1. The anti-rust paint prepared from this dispersion has a resistance time of 216 hours in the salt spray test under the conditions described in Example 1.

We claim:

1. An aqueous dispersion of an emulsion copolymer of
    (a) from 35 to 55% by weight of butadiene,
    (b) from 35 to 60% by weight of styrene,
    (c) from 1 to 3% by weight of $\alpha,\beta$-monoolefinically unsaturated monocarboxylic acids and/or dicarboxylic acids of 3 to 6 carbon atoms,
    (d) from 1 to 3% by weight of amides of $\alpha,\beta$-monoolefinically unsaturated monocarboxylic acids and/or dicarboxylic acids of 3 to 5 carbon atoms,
    (e) from 1 to 4% by weight of N-methylolamides of $\alpha,\beta$-monoolefinically unsaturated monocarboxylic acids and/or dicarboxylic acids of 3 to 5 carbon atoms, or their alkyl ethers, and
    (f) from 1 to 3% by weight of acrylic acid and/or methacrylic acid monoesters of alkanediols of 2 to 6 carbon atoms, the emulsion containing, as emulsifier, from 0.1 to 0.8% by weight, based on emulsion copolymers, of fatty alcohol-sulfonates and/or alkylbenzenesulfonates, where alkyl is of 12 to 16 carbon atoms.

2. A process for the preparation of an aqueous low-emulsifier dispersion of a carboxyl-containing butadiene-styrene emulsion copolymer, wherein
    (a) from 35 to 55% by weight of butadiene,
    (b) from 35 to 60% by weight of styrene,
    (c) from 1 to 3% by weight of $\alpha,\beta$-monoolefinically unsaturated monocarboxylic acids and/or dicarboxylic acids of 3 to 6 carbon atoms,
    (d) from 1 to 3% by weight of amides of $\alpha,\beta$-monoolefinically unsaturated monocarboxylic acids and/or dicarboxylic acids of 3 to 5 carbon atoms,
    (e) from 1 to 4% by weight of N-methylolamides of $\alpha,\beta$-monoolefinically unsaturated monocarboxylic acids and/or dicarboxylic acids of 3 to 5 carbon atoms, or their alkyl ethers, and
    (f) from 1 to 3% by weight of acrylic acid and/or methacrylic acid monoesters of alkanediols of 2 to 6 carbon atoms, are polymerized in aqueous emulsion in the presence of 0.1–0.8% by weight, based on monomers, of fatty alcohol-sulfonates and/or alkylbenzenesulfonates, where alkyl is of 12 to 16 carbon atoms, as the emulsifier.

* * * * *